United States Patent
Price (12)

(10) Patent No.: US 6,295,481 B1
(45) Date of Patent: Sep. 25, 2001

(54) SERIAL BUS CONTROL SYSTEM FOR SEWING EQUIPMENT

(75) Inventor: George Alan Price, Lawrenceville, GA (US)

(73) Assignee: ECP Family Properties, Lawrenceville, GA (US)

( * ) Notice: Subject to any disclaimer, the term of this patent is extended or adjusted under 35 U.S.C. 154(b) by 0 days.

(21) Appl. No.: 09/275,499

(22) Filed: Mar. 24, 1999

(51) Int. Cl.[7] ............................ G06G 19/00; D05B 19/12
(52) U.S. Cl. ................ 700/136; 112/470.05; 112/470.07
(58) Field of Search ...................................... 700/136, 137, 700/138, 130; 112/470.05, 470.04, 470.01, 277, 470.07, 306, 153, 220, 475.03

(56) References Cited

U.S. PATENT DOCUMENTS

| | | | |
|---|---|---|---|
| 3,818,849 | * 6/1974 | Maddox, Jr. | 112/275 |
| 4,481,507 | 11/1984 | Takiguchi et al. | 340/679 |
| 4,867,080 | 9/1989 | Taylor et al. | 112/80.32 |
| 4,924,790 | 5/1990 | Kondo et al. | 112/272 |
| 5,042,409 | * 8/1991 | Tanaka | 112/306 |
| 5,161,476 | 11/1992 | Suzuki | 112/306 |
| 5,269,257 | 12/1993 | Yamazaki | 112/262 |
| 5,271,347 | 12/1993 | Carreras Fontcuberta | 112/262 |
| 5,437,238 | 8/1995 | Price et al. | 112/470 |
| 5,498,172 | 3/1996 | Noda | 439/404 |
| 5,509,029 | 4/1996 | Furuta | 375/228 |
| 5,522,332 | 6/1996 | Price et al. | 112/470 |
| 5,562,060 | 10/1996 | Price et al. | 112/470 |
| 5,657,711 | 8/1997 | Price et al. | 112/470 |
| 5,664,962 | 9/1997 | Noda | 439/394 |
| 5,718,183 | * 2/1998 | Shimizu et al. | 112/275 |

OTHER PUBLICATIONS

Sunz Sensors S–LINK Sensor & Wire & Saving Link System of T Branch Multi Drop, Nov. 1994.

* cited by examiner

Primary Examiner—Peter Nerbun
(74) Attorney, Agent, or Firm—Womble Carlyle Sandridge & Rice PLLC

(57) ABSTRACT

A serial bus control system for an automatic sewing station for attaching a series of work pieces includes a serial bus cable connected to a power supply and a system controller. A program module is plugged into the serial bus cable and is programmed with an operations program or set of command instructions that are accessed and run by the system controller for controlling the automatic sewing station. A series of input modules are removably connected to the serial bus cable and receive inputs from various detectors monitoring the position and movement of the work pieces along a sewing path through the automatic sewing station. The input modules transmit this input information to the system controller via the serial bus cable in response to which the system controller sends command signals to a series of output modules that are connected to the operative elements of the sewing station, such as a sewing machine and upstream and downstream drive assemblies, to control the operation of the sewing machine and such other operative elements of the sewing station.

31 Claims, 13 Drawing Sheets

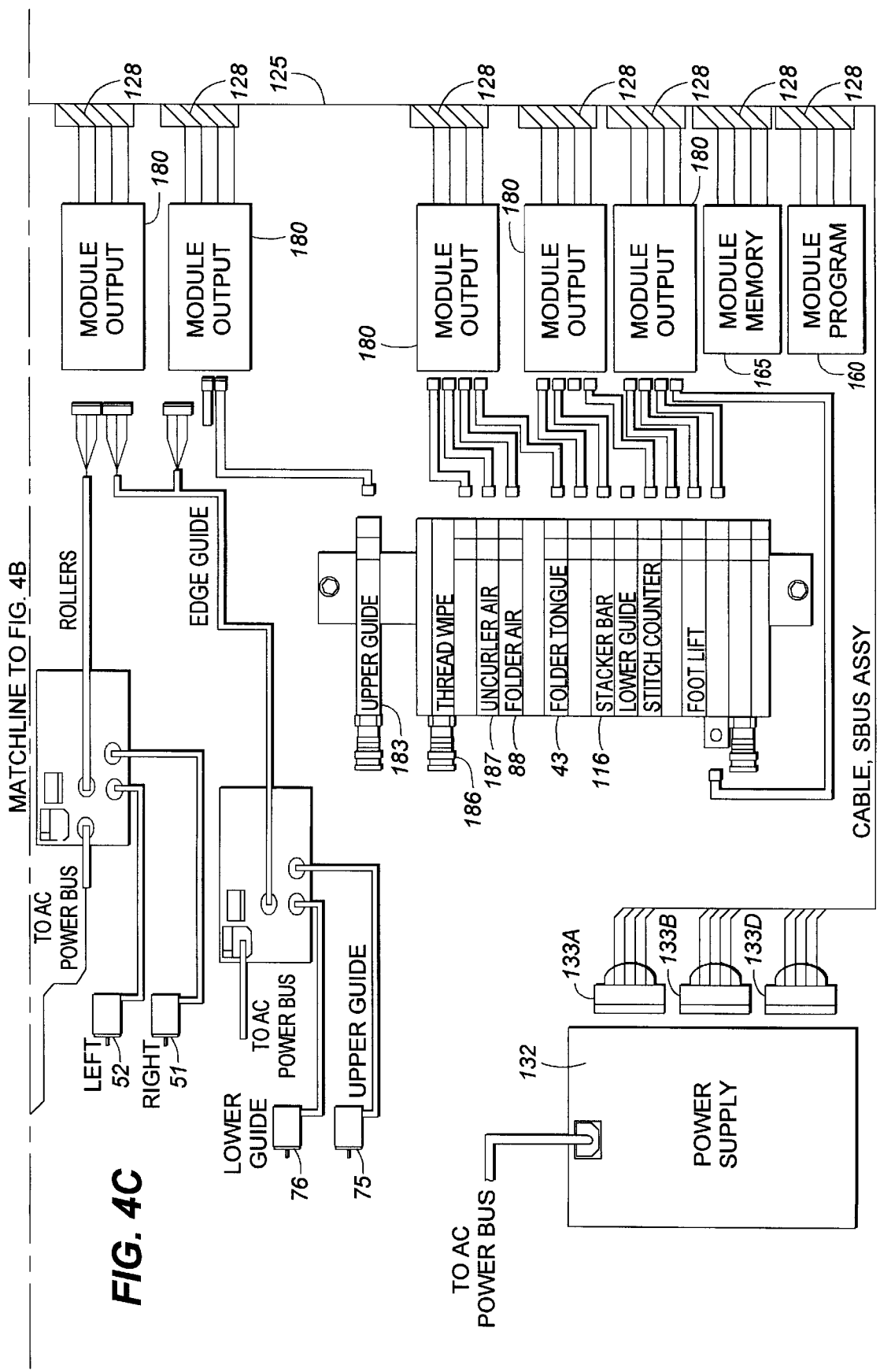

SERIAL BUS CONTROL SYSTEM FOR SEWING EQUIPMENT

FIELD OF THE INVENTION

The present invention relates to a control system for automated sewing equipment or stations. In particular, the present invention relates to a serial bus control system for controlling an automated sewing station in which a series of modules are provided for controlling various operative assemblies and functions of the automatic sewing station, which modules are connected to a serial bus cable and are detachable for ease of repair and maintenance of the control system.

BACKGROUND OF THE INVENTION

The manufacture of textile articles, and primarily the manufacture of garments, has become highly automated in recent years with sewing machinery or equipment having been developed to automatically cut, fold, sew and stack fabric or textile work pieces to form the work pieces into finished garments and parts of garments for later attachment. As such automated sewing equipment has developed, greater emphasis has been placed on the ability of such equipment to accurately and uniformly process the textile work pieces at greater processing rates with less skilled operators running the equipment without sacrificing or impairing the quality of the garments being produced.

For example, U.S. Pat. Nos. 5,437,238 and 5,657,711 of Price et al. disclose garment hemming systems in which a garment is placed on a series of spindles. Upon actuation, the machine automatically folds and sews the hem in the body of a T-shirt or sweat shirt. A series of detectors or sensors mounted along a sewing path for the work pieces detect the position of the edge of the garment body and automatically control the operation of edge guides to automatically adjust the position of the edge of the garment body with respect to the sewing path to insure that the proper hem width is maintained during sewing to form a high-quality finished garment. As a result, using such automated equipment, garments and garment parts can be produced with greater reliability and at increased production rates using less skilled workers, enabling a reduction in the costs of manufacturing of such garments and garment parts without detracting from the quality of the garments produced.

To achieve these goals of greater uniformity, quality and production rates for the garments, while at the same time enabling the garments to be produced by less skilled workers, conventional automated sewing machinery or equipment has had to become much more sophisticated and complex in its operation, requiring multiple detectors or sensors and microprocessor based control elements. Consequently, the manufacture, installation, set-up and maintenance such conventional automated sewing equipment also has become increasingly complex, typically requiring extensive point-to-point wiring for electrical connections between components or devices and their controls. In addition, highly trained or skilled personnel, including electricians, generally are necessary for the set-up and maintenance of conventional automated sewing equipment in a customer's plant.

Since many plants, especially those in remote locations, do not have such highly trained or skilled technical personnel on staff, it often is necessary for the manufacturers to send technicians to the field to a customer's plant if maintenance is required or there is a problem with the automated sewing equipment. Such technicians visits are expensive for both the customer in terms of machine down time and for the manufacturer in travel costs and technician time, and are especially costly where the technician must travel out of country, which is increasingly the case given the current trend of much of the garment production shifting to overseas markets such as South America Under such circumstances, it is often difficult and significantly expensive to get appropriate parts and/or a technician from the manufacturer to the customer's plant on a timely basis to diagnose and then fix the problem with the equipment. Further, with the extensive point-to-point wiring typically found in most automated sewing equipment where there are sometimes hundreds of individual wires and connections that must be checked, to diagnose problems with the equipment. The complexity of the equipment thus further complicates the repair and troubleshooting of problems with the equipment, often making it impractical to perform diagnostics and repair of equipment accurately from long distance.

Accordingly, it can be seen that a need exists for a control system for automated sewing equipment that is simple and easy to install and to perform diagnostics on both remotely and on-site, and to maintain, and which does not require skilled technicians for its maintenance and repair, thus enabling customers in the field to repair and make modifications to the equipment as needed to expand its capabilities.

SUMMARY OF THE INVENTION

Briefly described, the present invention comprises a serial bus control system for automated sewing equipment such as, by way of example, an automated sewing or hemming station as is conventionally known in the art, for processing textile work pieces such as by folding, trimming and sewing the edges of such work pieces to form garment parts and/or finished garments. Generally, the automated sewing equipment or station includes a sewing machine or sewing head as conventionally known, positioned along a sewing path for the work pieces and having at least one sewing needle that engages and sews a line of stitching in the work pieces as the work pieces are moved along the sewing path. The automated sewing equipment further typically includes a drive system or mechanism, such as series of puller rollers, over which the work pieces such as a shirt body or pants body are received. The puller rollers generally include at least one or more drive rollers and at least one idler roller that can be movable longitudinally along the sewing path for applying tension to the work pieces, and which pull or move the work pieces about the sewing path and beneath the needle.

The automated sewing equipment also can include a folder assembly having a movable folder tongue and stationary folder plate for engaging and folding an edge of the work piece onto trio a portion of the body of the work piece in order to form a fold or hem that is sewn by the sewing needles. Sensors generally are positioned along the upper and lower runs of the sewing path to monitor the position and movement of the work piece and the raw and unfolded edges thereof and transmit this information back to a system controller or computer for the sewing equipment. In response, edge assemblies are operated to cause the work piece to be moved laterally across the sewing path as needed to align the edges of the work pieces for sewing.

The serial bus control system of the present invention generally includes a system controller that comprises a computer or microprocessor based control and a user interface or display such as a keypad, touch-screen or a conventional personal computer type interface having a display screen and keyboard for entry of instructions. The computer provides the interface through which the operator inputs production information and for control of the operation of the automated sewing equipment according to programmed operation instructions. A serial bus cable is connected to the controller via an adapter module and to a power supply. The serial bus control cable normally is a four conductor ribbon type cable having four wires or conductor lines at least one of which is used for power and at least two of which are used for data transmission. The adapter module filters the bus power and provides over current protection for the controller and passes data signals from the controller to the bus cable. The serial bus cable provides for the transmission of data and operation instructions and power between the system controller and the various automatically operated or functioning devices or attachments for the sewing equipment, such as the sewing machine, drive rollers and folder assembly, without requiring extensive point-to-point wiring between the devices and the controller.

A series of modules are mounted along the length of the serial bus cable and are connected to the serial bus cable with snap or press-fit type connectors to enable easy installation and removal of the modules from the serial bus cable for ease of replacement. The modules include a memory module that stores system data for error monitoring, production information, and adjustable values that affect machine operation. A program module stores a copy of the operation program for the automatic sewing equipment. The serial bus control system further includes at least one input module that is connected to the sensors for the sewing equipment. The input module receives and transmits information regarding the position and movement of the work pieces as detected by the sensors to the system controller. One or more output modules are also connected to the serial bus cable, with each output module being linked to different assembly or series of devices of the automated sewing equipment, such as the sewing machine with its sewing needle and knife, the drive rollers, as well as the movement of the folder tongue of the folder assembly.

Each module generally is preprogrammed with a generic function or series of functions based upon the type of module. Each module further is programmed with an identifier such as a serial number that serves to uniquely identify that module. During the initial set-up of the serial bus control system of the present invention, after the memory module and program module have been installed, each of the input and output modules is individually installed one-by-one, as by fitting their mating connector into a corresponding connector positioned along the serial bus cable. As each module is added, the system controller scans the serial bus cable and records the pre-programmed serial number so as to identify the newly added module and assigns the proper routine or portion of the control software in the controller to control that module. The serial number and software assignment of each module are stored in the memory module of the serial bus control system and the modules and the system controller communicate with one another on the basis of these stored module serial numbers.

During the operation of the serial bus control system for controlling the automated sewing equipment, the input modules are polled periodically by the system controller for input information and updates regarding the position and movement of the work pieces being processed on the automated sewing equipment. In response, the system controller sends operations commands to the various output modules based upon the control program for the equipment to cause the drive system to rotate and pull the work pieces along the sewing path, and to control the operation of the sewing machine and the movement of the folder assembly in order to tension, rotate, fold, sew and trim the work pieces to form finished garment parts or garments.

In the addition, the serial bus control system of the present invention through its use of plug-in modules, enables quick and easy diagnosis and repair of the system in event of a break down and modification or upgrading of the system. The internal diagnostics of the controller can isolate a problem and identify the particular damages/problem module, by its serial number and/or address. This module then is simply disconnected from the serial bus cable and a new module for performing the same function or functions as the replaced module is inserted into its place. Thereafter, when the system is powered up again, the system controller will check each module and will recognize the new module by its different serial number from the replaced module based upon the serial numbers stored in the memory module and will assign the functions of the old, replaced module to the new module. In addition, it is also possible to link the controller of the serial bus control system to a modem or to a computer network to enable diagnostics to be run on a control system for the automated sewing equipment remotely or through a computer network. The connection of the system to a computer network further enables production information and error information to be compiled and recorded at a central server. As a result, the present invention thus provides a simple, reliable and easy to maintain system for controlling an automated sewing station or equipment.

Various objects, features and advantages of the present invention will become apparent to those skilled in the art upon the reading the following detailed description, when taken in conjunction with the accompanying drawings.

BRIEF DESCRIPTION OF THE DRAWINGS

FIGS. 4A–4C are schematic illustrations of an exemplary embodiment of the serial bus control system of the present invention for controlling the automatic sewing station of FIG. 1.

DETAILED DESCRIPTION OF THE PREFERRED EMBODIMENT

Figure 1:
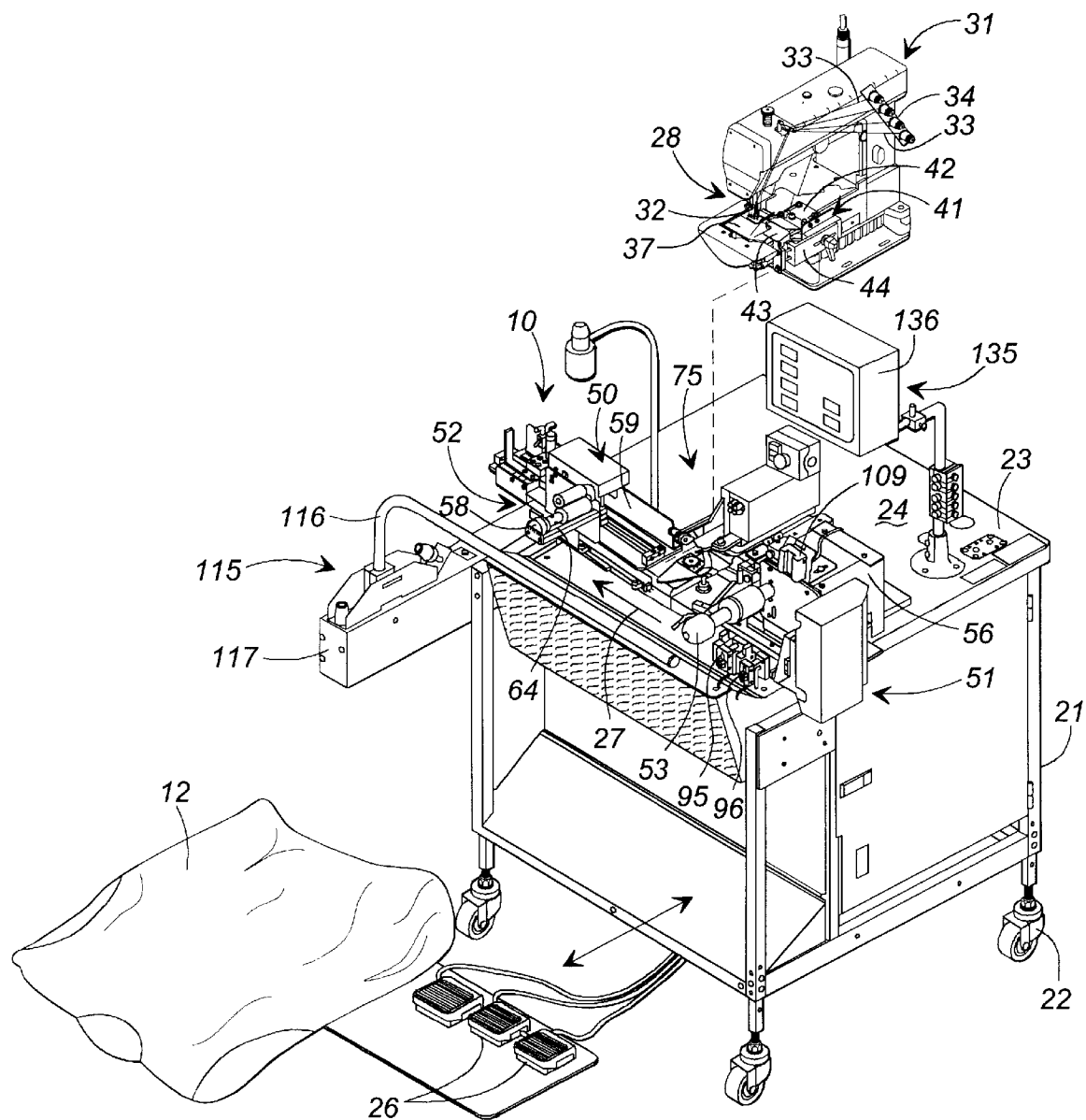
FIG. 1 is a perspective illustration of an example automatic sewing station controlled by the serial bus control system of the present invention.

Referring now in detail to the drawings, numeral 10 in FIG. 1 generally illustrates an automatic sewing station, here shown as a bottom hemming station, such as a Model 12788 Bottom Hemmer manufactured by Atlanta Attachment Company, for automatically hemming work pieces such as a T-shirt (12) or sweat shirt with a folded and sewn hem. It will, however, be understood by those skilled in the art that the automated bottom hemming station discussed below is disclosed merely for purposes of disclosing an exemplary automatic sewing station 10 or equipment for use with the serial bus control system 15 of the present invention. It further will be understood that the serial bus control system of the present invention therefore is not limited solely for use with an automatic bottom hemming station, but rather can be used with various other types of automated sewing equipment such as, for example, automatic elastic waistband attachment systems, collar attachment systems, automatic hemmer/seamer stations, or other types of automated processing systems.

As illustrated in FIG. 1, the bottom hemming station generally includes a machine frame 21 typically mounted on a series of wheels 22 such as caster wheels, and including a work table 23 mounted at the upper end or top of the machine frame 21 and having a substantially flat upper work surface 24. A series of foot pedals 26 are provided adjacent the front of the machine frame 21, connected to the sewing station 10 for initiating various operations or functions of the automated sewing system 10 as conventionally known in the art. A sewing path illustrated by arrows 27 extends across the sewing station in a generally elliptical path along an upper run and lower run. The garment body is moved along the sewing path during a sewing operation, passing through a sewing area, generally indicated at 28, for folding and sewing a bottom hem in the garment.

As illustrated in FIG. 1, a sewing machine 31 is mounted along the sewing path 27 at the sewing area 28. The sewing machine generally is a conventional sewing head such as is manufactured by Yamato, Pegasus or Rimoldi and typically includes one or more sewing needles 32 (FIG. 2) that receive a series of threads 33 from tensioned spools 34 mounted along the side of the sewing head, a presser foot 36 and a throat plate 37. A series of thread breakage detectors 38 (FIG. 4A) also generally are provided for monitoring the threads 33 (FIG. 2) and detecting a break so as to signal a fault condition. In addition, a knife or trimmer 39 (FIG. 4B) is mounted beneath the throat plate 37 (FIG. 2) for trimming a thread chain formed at the end of the lines of stitching sewn by the needles in the garment body to give the resultant hem a finished appearance.

Figure 2:
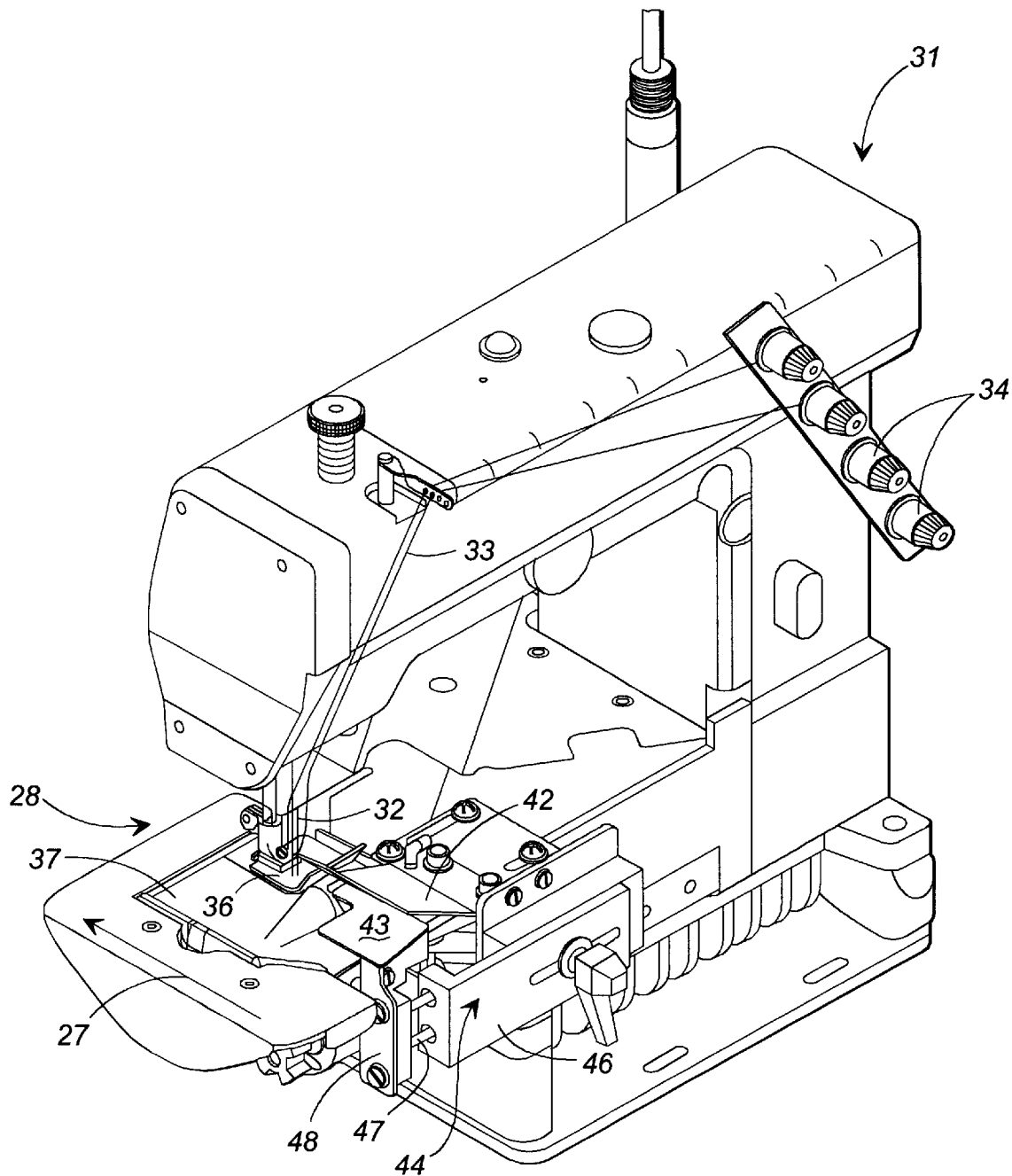
FIG. 2 is a perspective illustration of the sewing machine of the sewing station of FIG. 1.

As illustrated in FIG. 2, a folder assembly 41 is mounted along the upstream edge or side of the sewing area 28, positioned adjacent the presser foot 36 and sewing needles 32 of the sewing machine. The folder assembly generally includes a stationary folder plate 42 that is fixed in place to the base of the sewing machine. The folder plate generally is formed from a metal such as stainless steel having a smooth polished surface and extends upwardly at an angle and across the sewing path 27. A movable folder tongue 43, generally formed from a polished metal, is positioned along the sewing path opposite the folder plate and is movable laterally across the sewing path toward and away from the folder plate. The folder tongue is mounted to a cylinder assembly 44 that is adjustably mounted to the upstream side of the sewing machine and includes an air cylinder 46 having a pair of extensible cylinder rods 47 to which a mounting plate 48 is attached at the free ends thereof. The folder tongue attaches to the mounting plate such that as the cylinder rods 47 are extended and contracted by the cylinder 46, the folder plate is caused to move laterally across the sewing path into and out of a folding position beneath the folder plate for causing the waist edge of the garment body to be folded over the elastic waistband to form the folded hem for sewing by the sewing machine.

Figure 3:
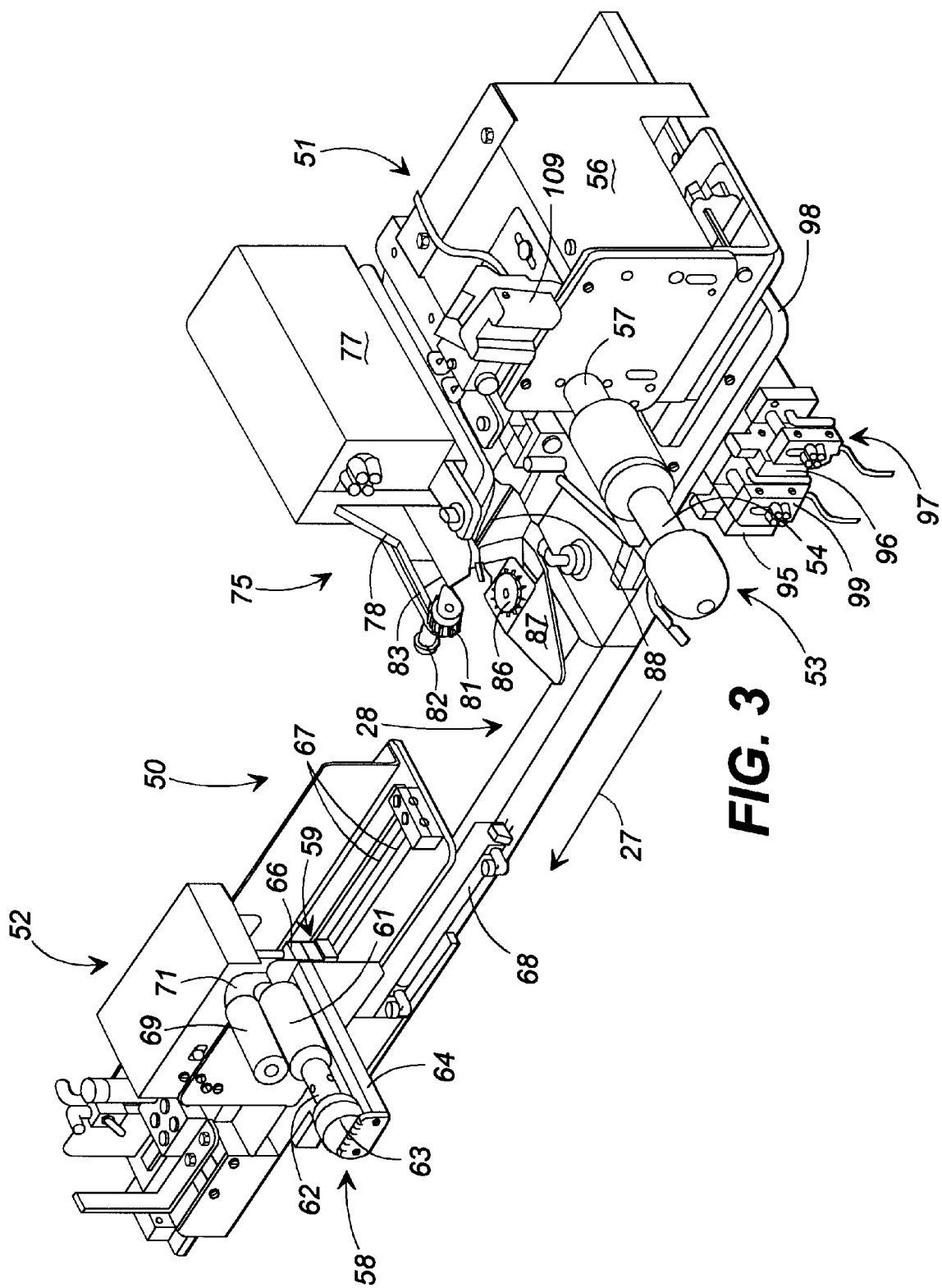
FIG. 3 is a perspective illustration of the edge guide assembly and sensors of the sewing station of FIG. 1.

As shown in FIGS. 1 and 3, a drive system 50 is mounted on the work table for moving the elastic waistband and garment body about the elliptical sewing path 27 during a sewing operation. The drive system includes an upstream roller assembly 51 positioned along the right side of the work table and a downstream roller assembly 52 positioned adjacent the left side of the work table. The upstream roller assembly 51, shown in FIG. 3, generally includes a substantially cylindrically shaped right drive roller 53 that extends laterally across the upstream end of the sewing path. The right drive roller generally is formed from a hard plastic material such as nylon and includes a notched portion 54. The right drive roller is connected to a variable speed motor (not shown) mounted within a housing, generally indicated at 56, mounted to the free end of a drive shaft 57 for the drive motor. During a sewing operation, the right drive roller 53 is rotated by its drive motor and tends to pull and move the garment body along its elliptical sewing path for folding and sewing to form a finished hem in the waist portion of the garment body.

The downstream roller assembly 52, illustrated in FIG. 3, includes a left drive roller 58 connected to a variable speed motor (not shown) mounted on a movable roller carriage 59. The left drive roller generally is cylindrically shaped, having a cylindrical base portion 61, a notched portion 62 of a reduced diameter similar to the notched portion 54 of right drive roller 53 and a front roller portion 63 that is movable in response to tension in the garment body as the garment body is stretched. A pivot arm 64 connects to the front roller portion 63 and is pivotably attached to the roller carriage 59 such that as the front roller portion is moved parallel to the sewing path in response to tensioning of the garment body, pivot arm 64 likewise is pivoted and moved substantially parallel to the sewing path. The opposite end of the pivot arm 64 is accordingly moved toward and away from a proxuimty sensor (not shown), so as to function as a tension sensor assembly. In response to the detection of the movement of the pivot arm by the proximity switch, a control signal is sent to halt the further longitudinal movement of the downstream roller assembly away from the sewing machine to avoid over-tensioning the garment body.

As illustrated in FIG. 3, the roller carriage 59 is mounted on slide blocks 66 that are slidably mounted on and slide along a pair of guide rods 67, which extend longitudinally parallel to the sewing path 27. A slide cylinder 68 is mounted horizontally in front of the carriage 59 and includes a cylinder rod (not shown) connected to at least one of the slide blocks 66 for the carriage. The slide cylinder generally is a conventional air cylinder connected to a supply of pressurized air (not shown) and functions to move the slide blocks and thus the carriage of the downstream roller assembly longitudinally back and forth along the sewing path in response to the detection of a garment body being placed over the drive rollers 53 and 58 for automatically tensioning the garment body.

In addition, a pinch roller 69 is mounted above and adjacent the base 61 of left drive roller 58. The pinch roller generally is an idler roller formed from a nylon or plastic material, and is movable toward and away from the base of the left roller for engaging and holding the garment body on the left drive roller as the garment body is drawn about the sewing path. The movement of the pinch roller typically is controlled by an air cylinder (not shown) that controls the pivoting movement of a support plate 71 to which the pinch roller is mounted, to cause the pinch roller to be pivoted toward and away from the base of the left roller.

A pair of edge guides are positioned along the sewing path immediately upstream from and adjacent the sewing machine for engaging and moving the garment body laterally across the sewing path to adjust the position thereof for sewing. The edge guides include an upper edge guide 75 shown in FIGS. 1 and 3 and a lower edge guide 76, indicated in FIG. 4C, each having substantially the same construction. As shown in FIG. 3, each edge guide generally includes a housing 77 in which a variable speed reversible motor (not shown) is mounted, and a pivoting support arm 78 that extends out of the housing and across the sewing path 27 (FIG. 3). A toothed guide wheel 81 is rotatably mounted at the end of the pivoting support arm, positioned above the sewing path in a position to engage the garment body as the garment body is moved along the sewing path. The guide wheel 81 is mounted to the pivoting support arm with a spring biased mounting pin 82 that enables the guide wheel to be moved longitudinally along the sewing path when a seam of the garment body passes in contact therewith to avoid disruption in the guiding or movement of the garment body or tangling of the teeth of the guide wheel in the garment body. A drive belt 83 extends along the length of the support arm and connects to the toothed guide wheel 81 to the variable speed reversible motor for driving the guide wheel.

An idler wheel 86 generally formed as a toothed wheel or having a star-shaped configuration is horizontally positioned on a mounting plate 87 in a position to be engaged by the teeth of the guide wheel when the guide wheel 81 is lowered into its engaging position within the sewing path of the garment body. The idler wheel provides a bearing surface against which the teeth of the guide wheel can engage and hold the garment body for moving or shifting the garment body laterally back and forth across the sewing path for alignment with the sewing needles of the sewing machine. Airjets 88 (FIG. 3) typically are provided adjacent the upper edge guide 75 immediately upstream from the folder assembly 41 (FIG. 1). The air jets generally are connected to the air supply for the sewing station to receive a supply of pressurized air so as to blow a flow of air across the sewing path and against the edges of the garment body to prevent the garment body from curling prior to being folded and sewn.

Figure 4A:
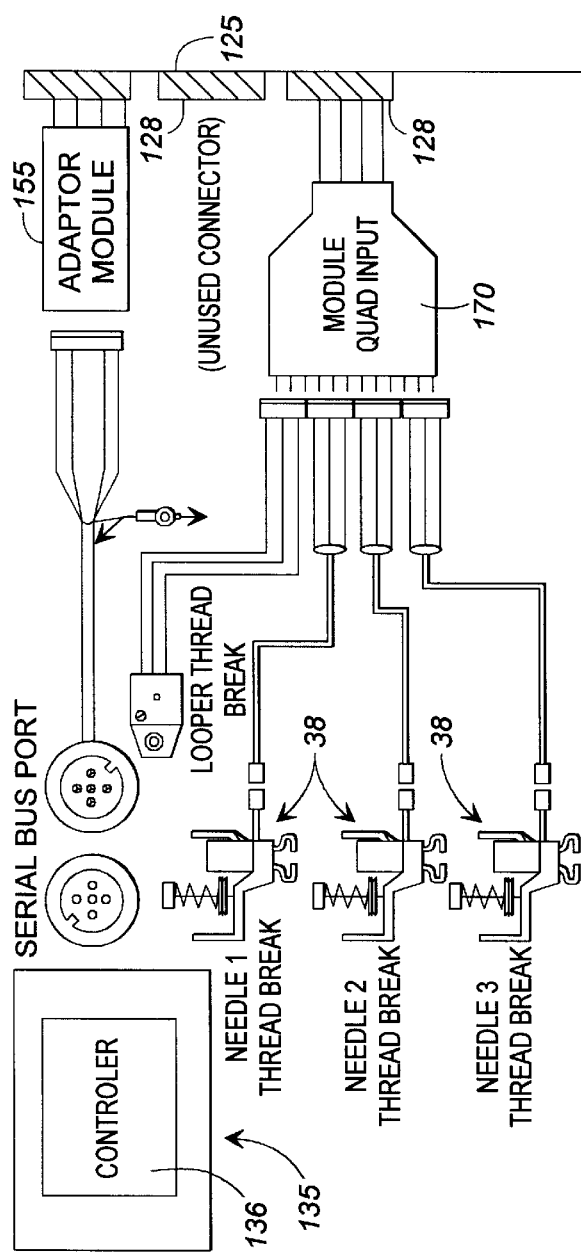
Figure 4A:
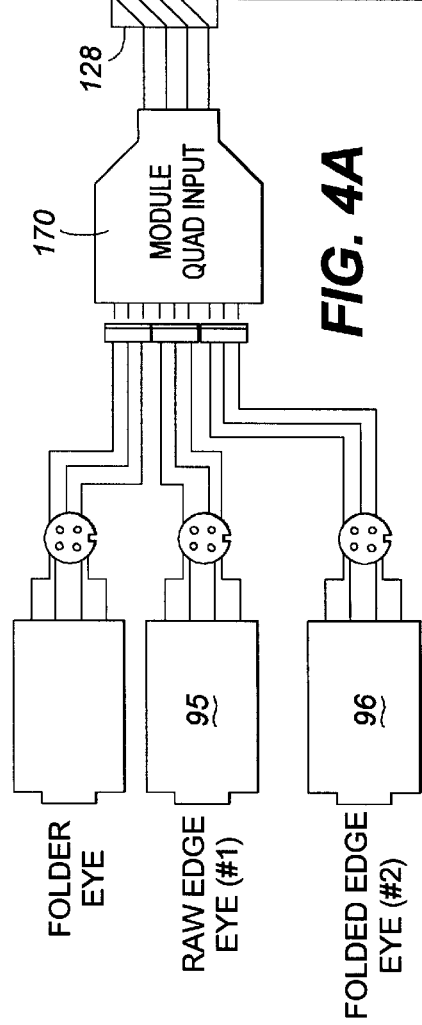

As FIGS. 1, 3 and 4A illustrate, a series of input devices such as sensors or detectors typically are provided for monitoring and providing feedback as to the position and movement of the garment body along the sewing path during a sewing operation. The sensors include a raw edge detector 95 positioned below the right or downstream drive roller along the outer edge of the sewing path and a folded edge detector 96 positioned adjacent the raw edge detector. The raw edge detector and folded edge detector both are generally photoelectric cells or similar types of sensors, such as fiber optic eyes, laser detectors or the like, directed at different positions along the sewing path of the garment body. The raw edge detector and folded edge detector 95 and 96 (FIG. 3) are mounted to an adjustable mounting assembly 97 which includes a mounting bar 98 and adjustable mounting plates 99 for adjusting the position and orientation of the detectors.

At the start of a sewing operation, when the folded edge detector 96 is initially covered so as to indicate a dark condition, a control signal is sent to cause the left or downstream drive roller 58 to be moved longitudinally along the sewing path toward the downstream end thereof until the tension sensor is engaged so as to stop further movement of the downstream roller assembly. Thereafter, a prefeed jog cycle is initiated and run for a desired preset time for a prefeed jog. During this prefeed jog cycle, a folder eye or sensor (not shown) positioned underneath the folder assembly monitors the movement of the garment body to ensure that the folder is properly loaded and the edge guides are properly functioning. Thereafter, the raw edge and folded edge detectors control the operation of the lower edge guide to control the position of the edge of the garment body along the lower run of the sewing path. The folder eye or sensor (not shown) positioned beneath the folder assembly thereafter operates to control the operation of the upper edge guide 75 during a sewing operation as the raw edge detector and folded edge detectors 95 and 96 control the operation of the lower edge guide assembly 76 (FIG. 4C).

In addition, as illustrated in FIGS. 1 and 3, a thumb switch 109 or similar type of actuator is mounted at the downstream side of the sewing station 10. During semi-automatic operation, after the garment body has been loaded on the drive rollers, the operator moves his or her thumb along the thumb swipe switch 109 to initiate a sewing operation.

As illustrated in FIG. 1, a stacker arm assembly 115 is mounted at the front of the work table 23 of the machine frame 21. The stacker arm assembly generally includes a stacker or wiper bar 116 that extends across the front of the machine frame in a direction substantially parallel to the sewing path. The stacker bar is attached to an actuator 117, which typically can be pneumatically operated or electrically operated, as conventionally known in the art. The actuator is engaged at the end of a sewing cycle so as to cause the wiper bar 116 to be moved from an initial position extending toward the sewing station and positioned beneath the garment body to an extended position pivoted and spaced outwardly from the sewing station and sewing path so as to pull the garment body off of the drive rollers and away from the sewing machine.

As a result, the finished sewn garment body is automatically removed from the drive rollers and stacked on previously sewn garments that are received over and stacked on the stacker tray (not shown) to form a bundle of finished, hemmed garments that later can be removed for further processing as needed.

Figure 4B:
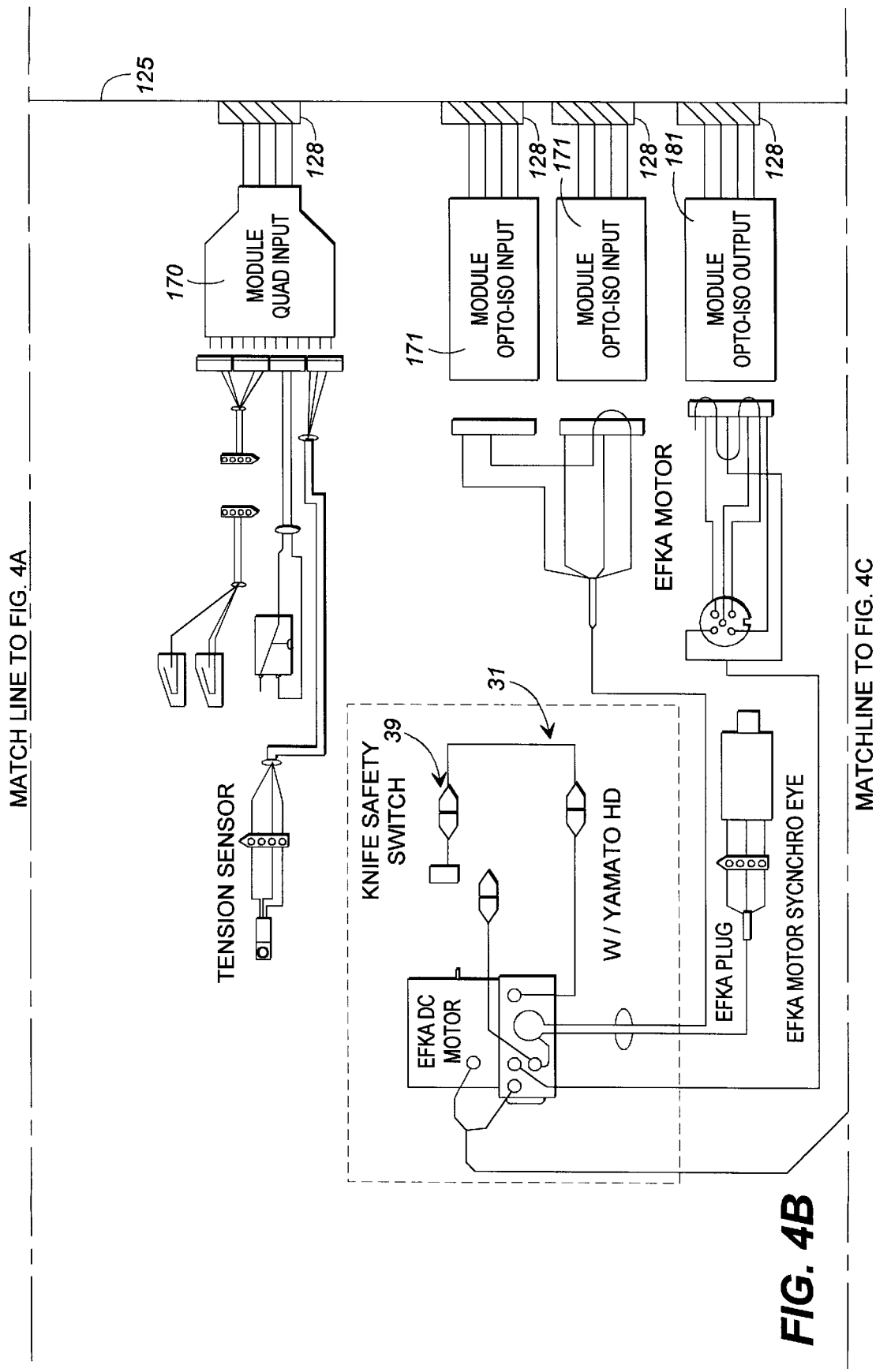
Figure 5:
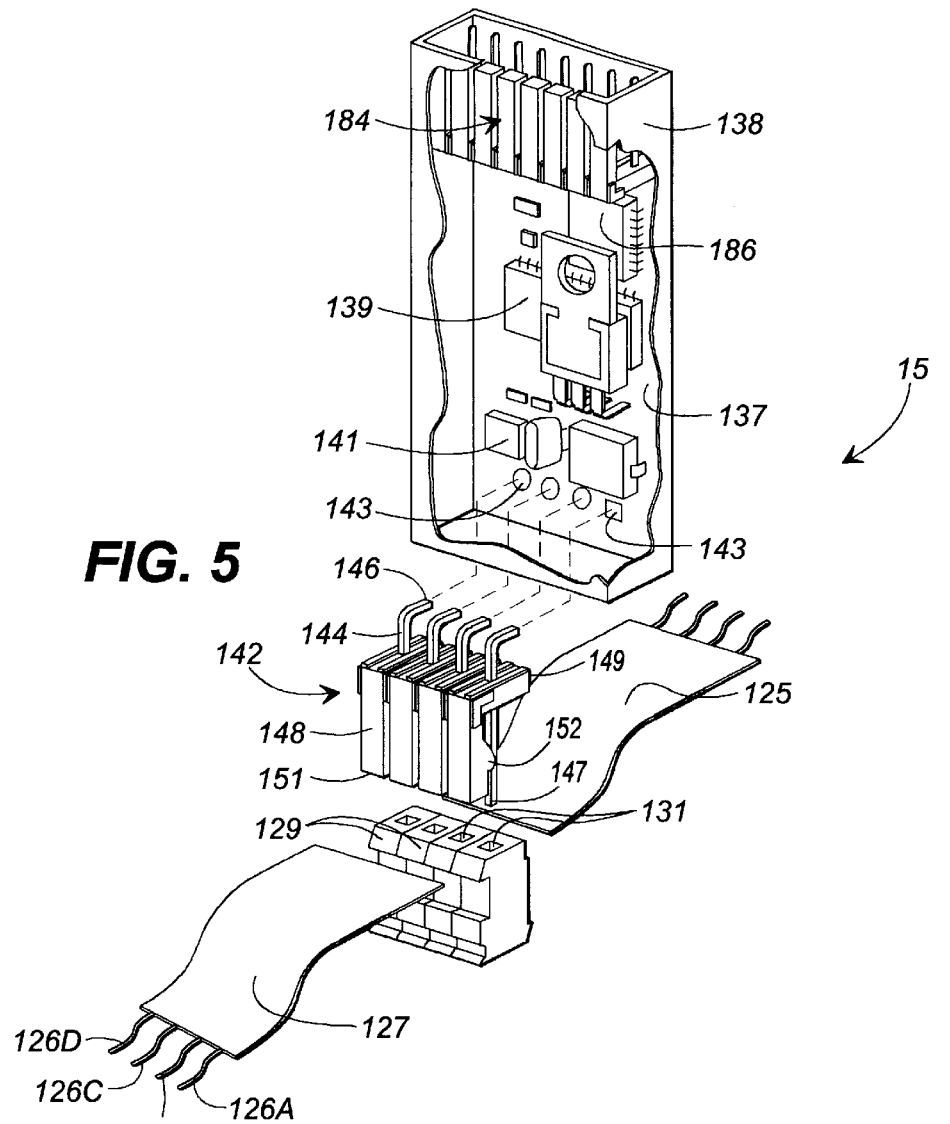
FIG. 5 is a perspective view schematically illustrating the serial bus cable with a connector and a module.

FIGS. 4A–4C schematically illustrate the serial bus control system 15 of the present invention for implementing a desired control program for controlling the sewing operations of an automatic sewing station, which is shown in the present exemplary embodiment for purposes of illustration only as being a bottom hemming station. The control program includes programmed instructions or commands for the various operative elements of the automatic sewing station, and also includes internal diagnostics for detecting, diagnosing and troubleshooting faults or problems with the system. The serial bus control system includes a serial bus cable 125 that generally is a four conductor ribbon cable such as an 18 gauge wire cable such as S-LINK® loop wiring. Generally the serial bus cable has four wires or transmission lines 126A–126D that typically are standard UL 1569 wire bonded and covered with a standard plastic or rubberized coating or cover 127 to form the flexible ribbon cable as illustrated in FIG. 5. Two of the wires 126C–126D transmit data/instructions. One of the wires 126B generally carries power or current, while the remaining wire 126A acts as a ground wire.

A series of connectors 128 are mounted along the length of the serial bus cable 125 at various positions therealong.

Each of the connectors generally is a four position female wire connector such as a .156 MAS-CON® IDC electrical connector, manufactured by ITW Panduit Corp., and typically is formed from a hard plastic material. The connectors 128 includes a series of retainers 129 spaced from one another to define open ended channels 131 in which are positioned metal contacts (not shown) for engaging the wires of the serial bus cable. As illustrated in FIG. 5, the connectors are snap or press fitted onto the serial bus cable with each of the wires 126A–126D of the serial bus cable received within one of the channels 131 and engaging the contacts, which pierce the insulation of each wire to create electrical contact with the wires and thus form gas-tight connections between the wires of the serial bus cable and the connectors.

As illustrated 4C, the serial bus cable 125 connects at one of its ends to a power supply 132. The power supply generally is a 24 volt direct current switch mode power supply with built in surge suppression and power factor correction so as to accept power fluctuations in alternating current within a range of approximately 60 volts up to approximately 265 volts. The power supply places 24 volts of direct current on the serial bus, which is in turn supplied to the various operative assemblies of the sewing station by the serial bus cable as indicated in FIGS. 4A–4C. A series of 3 outlet connectors 133 connect the power supply to the serial bus cable and allow branching of one to three serial bus cables off the power supply. Each connector 133 is generally a 6-pin header connector manufactured by ITW Panduit. As shown in FIGS. 1 and 4A, the serial bus control system 15 also includes a system controller 135 that typically is mounted above the work surface 24 (FIG. 1) of the work table 23 for access by the operator. The system controller 135 (FIG. 4A) typically comprises a computer or processing unit with a touch screen liquid crystal display 136 (FIG. 1). It also will be possible to use other types of input devices in place of the touch screen of the system controller such as a keyboard or keypad together with a monitor or display. The system controller can be a stand alone computer unit for the particular sewing station or can be linked to a computer network server or other computer systems at remote locations via a modem for remote monitoring and diagnostics. The operator inputs system commands and can monitor the performance of the sewing station in terms of down time due to fault conditions and other production information through the system controller.

As shown in FIGS. 4A–4C, a series of plug-in modules connect to the serial bus cable 125 at the connectors 128. The modules each generally include a circuit board 137 (FIG. 5), typically encased within a housing or plastic shrink warp 138, and having a series of electronic components including a processor chip 139, transceiver 141 for interfacing with the serial bus and a four-pin bus connector header 142 for connecting the module to a connector 128 of the serial bus cable as illustrated in FIG. 5. Each processor chip generally is an 8-bit microprocessor such as manufactured by MICROCHIP TECHNOLOGY, INC., and each generally is preprogrammed with a desired set of instructions or functions. As shown in FIG. 5, a series of contact pads or traces 143 generally formed from cooper, gold or similar electrically conductive material, are applied to the circuit board 137. These pads generally are contacts with connector pins of a programming device (not shown) for programming the processor chip of the module with desired instructions, which is typically a one-time programming operation.

Also, as illustrated in FIG. 5, each of the four-pin connector headers 142 that connect the modules to a connector of the serial bus cable typically include an L-shaped lead or pin 144 that is generally formed from a metal such as a copper alloy that is tin plated or similar electrically conductive material each having one end 146 soldered to the circuit board 137 and an opposite or free end 147 adapted to engage a connector 128 of the serial bus cable to form an electrical connection therewith. Each connector further includes a series of locking supports 148 through which the pins 144 are extended Each locking support generally is formed from a plastic material such as polyester and is substantially L-shaped, having a first end 149 that is mounted to the circuit board and a second end 151 that extends substantially parallel to the upper surface of the circuit board and which includes a locking tab or protrusion 152 that engages a retainer 129 of a connector 128 in a mating, locking relationship to lock the module to the connector and thus to the serial bus cable. The locking tabs 152 and flexible locking supports 148 enable the modules to be releasibly attached to the connectors of the serial bus cable in a snap or press fit type arrangement for ease of removable and replacement.

In addition, splices (not shown) having a similar construction to the four-pin bus connector headers of the modules can be received or locked into an unused connector of the serial bus cable. A female connector of an additional serial bus cable can then be attached to the connector of the first serial bus cable with the splice to enable additional serial bus cables to be connected in series or branched to the first serial bus cable as needed for controlling further operations for expanding the operation of the sewing station.

Figure 6:
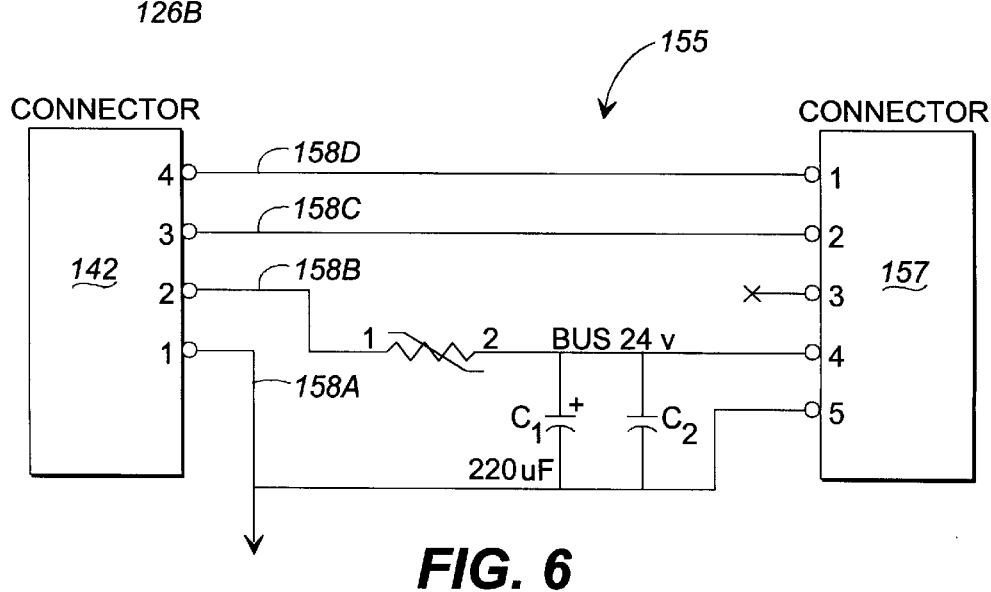
FIG. 6 is a schematic diagram of an adapter module for the serial bus control system of the present invention.

The modules include a series of different types of modules that perform different functions, including an adapter module 155, schematically illustrated in FIG. 6. The adapter module 155 includes a first, four-pin bus connector header 142 that mates with and connects to the serial bus cable at one of its connectors 128. A second, five pin connector header 157 is provided at the opposite end of the adapter module and connects to the computer of the system controller to thus connect the system controller 135 (FIG. 4A). The adapter module includes a series of four transmission lines or connections 158A–158D between the two connectors 156 and 157, including two for the transmission of data 158C–158D, at least one power transmission line 158B and a ground 158A. The adapter module filters the power from the serial bus cable to the system controller and provides additional over-current or surge protection. Thus, power and data are passed directly through the adapter module from the serial bus cable into the system controller for powering the system controller and for transmitting and receiving data information and operation commands.

Figure 7:
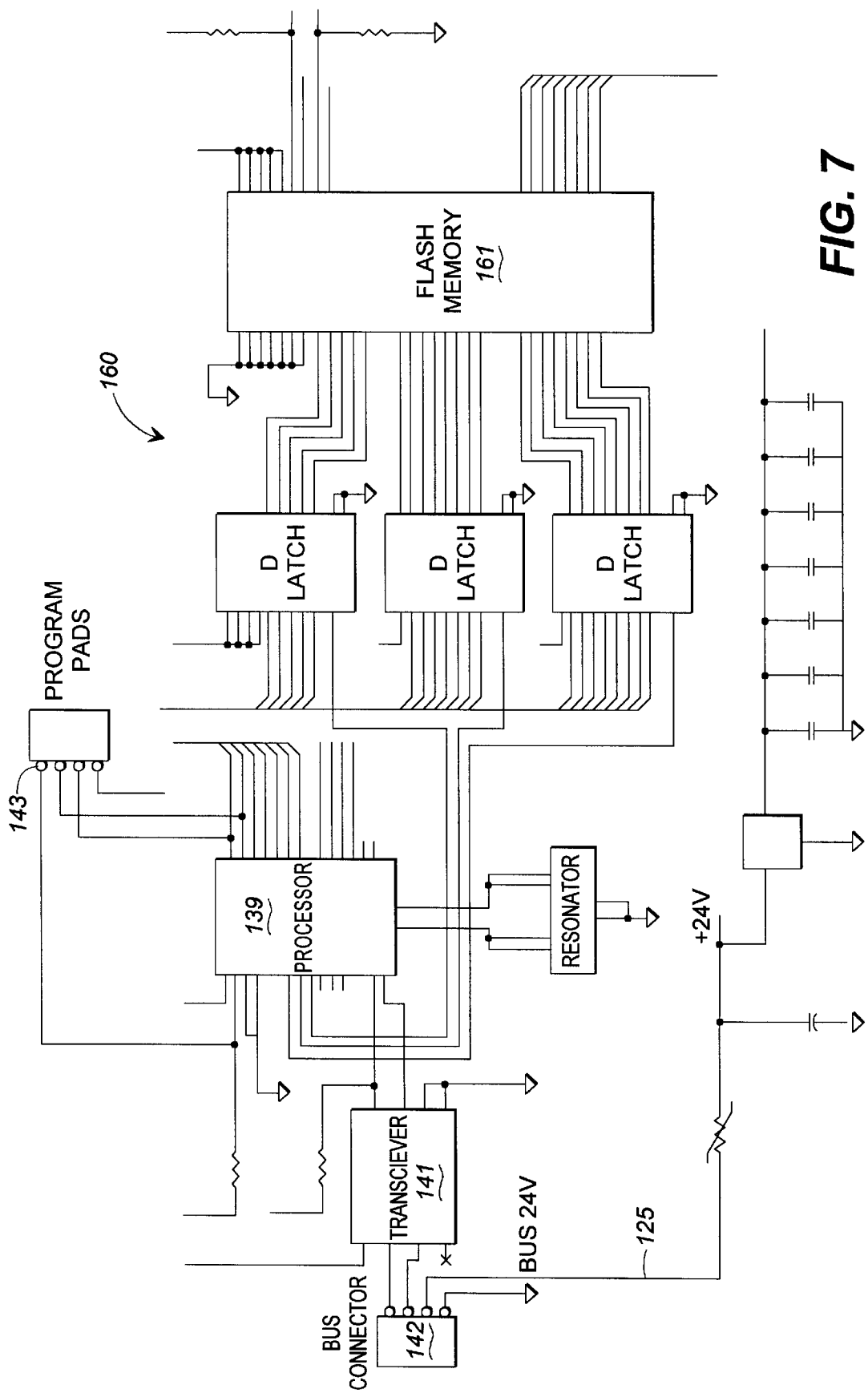
FIG. 7 is a schematic diagram of a program module for the serial bus control system of the present invention.

As shown in FIG. 4C, a program module 160 is mounted along the serial bus cable, typically at one end thereof, communicating with the system controller via the serial bus cable. As illustrated in FIG. 7, the program module 160 includes a four pin connector bus header 142 for attaching to a connector 128 (FIG. 5) for the serial bus cable 125 in a snap or press fit type arrangement to releasibly connect the program module to the serial bus cable. The program module includes a processor chip 139, and flash memory, indicated at 161, for storing program information. The program module stores a copy of the operating or control software for the serial bus control system that is executed in the system controller, thus functioning as RAM memory for the system controller.

The control program or software is generally the same program as conventionally used for controlling the sewing station's automatic sewing cycle or operation. The control program includes a series of program or software subroutines or commands for communicating with the various output modules to control the functions of the automatic sewing station. The control program further includes diagnostic subroutines that enable the system controller to detect and diagnose fault conditions such as a defective module.

Figure 8:
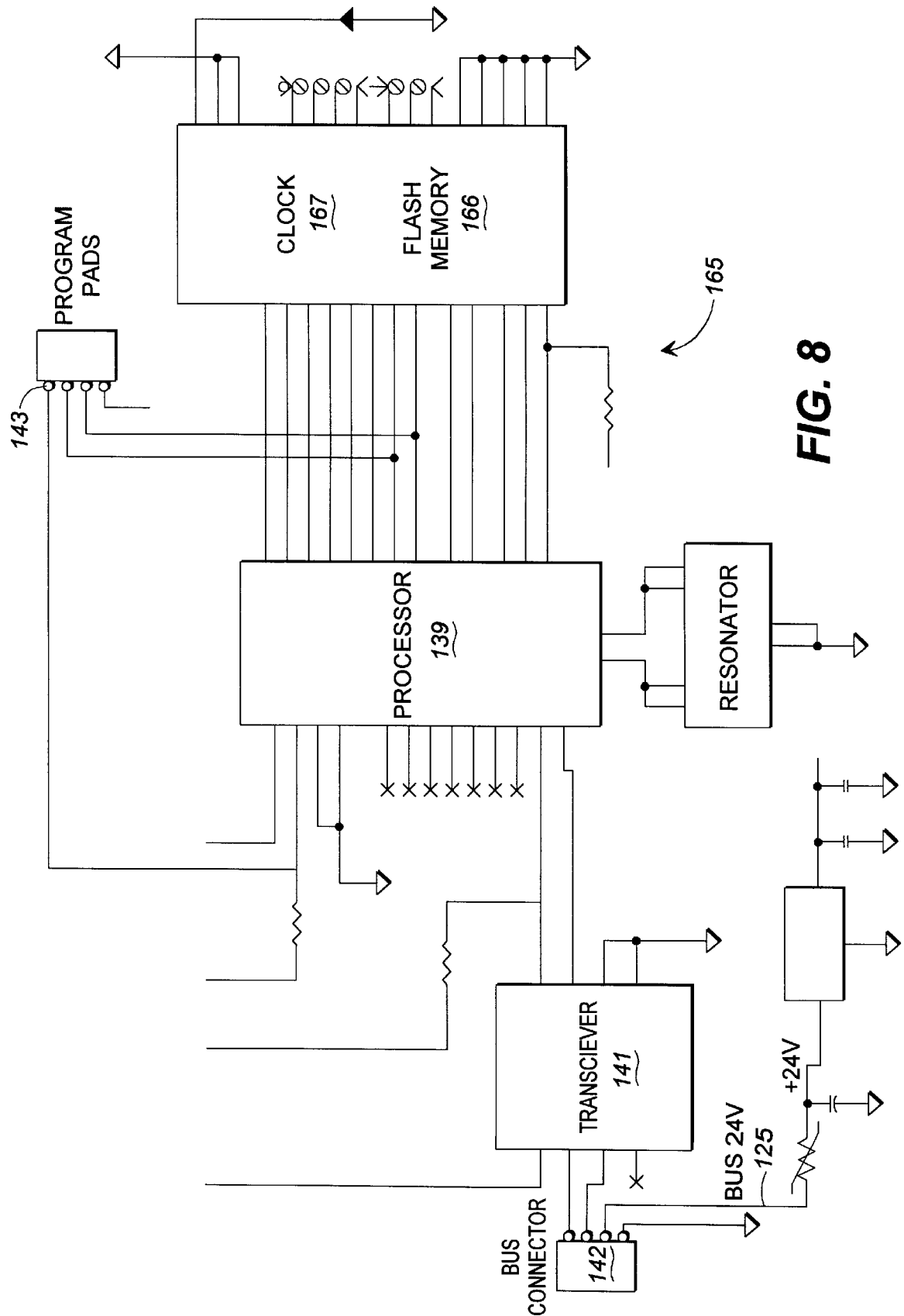
FIG. 8 is a schematic diagram of a memory module for the serial bus control system of the present invention.

A memory module 165 (FIGS. 4C and 8) is mounted on the serial bus cable 125 at a desired location, such as adjacent the program module. The memory module 155 includes a four pin bus connector header 142 (FIG. 8) for attachment of the memory module to the serial bus cable. The memory module 165 (FIG. 8) further includes an 8 bit processor chip 139, flash memory 166, and a clock or timer 167 for monitoring and recording data on a real time basis and providing the clock for the system controller. The memory module provides additional memory outside of the computer of the system controller for storing production data for the sewing station and real time stamped error logging and adjustable values affecting machine operation such as stitch counts, and operation/machine speeds.

As illustrated in FIGS. 4A–4B, a series of quad input modules 170 and opto-iso input modules 171 are mounted along the serial bus cable and connect to various input devices for the dewing station, such as thread breakage detectors, the upper edge guide, hem detect eye, raw edge guide and folded edge guide, as well as the tension sensor that provide input information as to the operation of the sewing station and which monitor and report the position and movement of the garment body therethrough. Generally, the serial bus control system will include one or more input modules depending upon the number of inputs for the sewing station. The quad input modules 170 (FIG. 9A) and opto-iso input modules 171 (FIG. 9B) both include a four pin bus connector header 142, by which the input modules are connected to a connector of the serial bus cable in the same fashion as the snap fit connections of the adapter, control and memory modules to the serial bus cable. Each input module further includes a processor 139 (FIGS. 9A and 9B), which is generally an 8 bit processor chip that is preprogrammed with a series of functions for processing input information regarding the movement, position and tensioning of the garment body as it is moved along the sewing path and for monitoring the operation of the sewing machine in response to signals from the various detectors and the foot pedals.

Figure 9A:
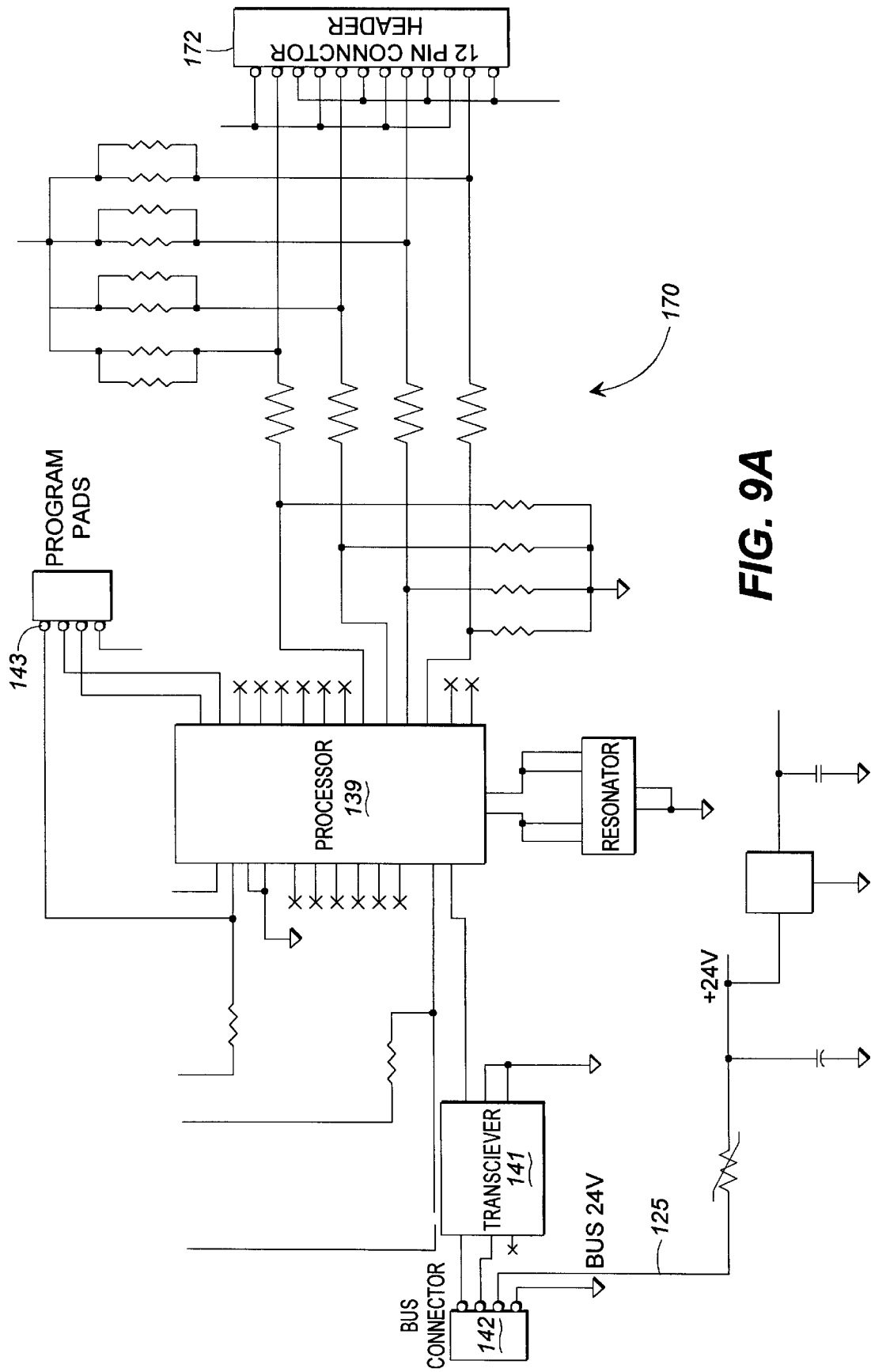
FIGS. 9A–9B are schematic diagrams of input modules for the serial bus control system of the present invention.
Figure 9B:
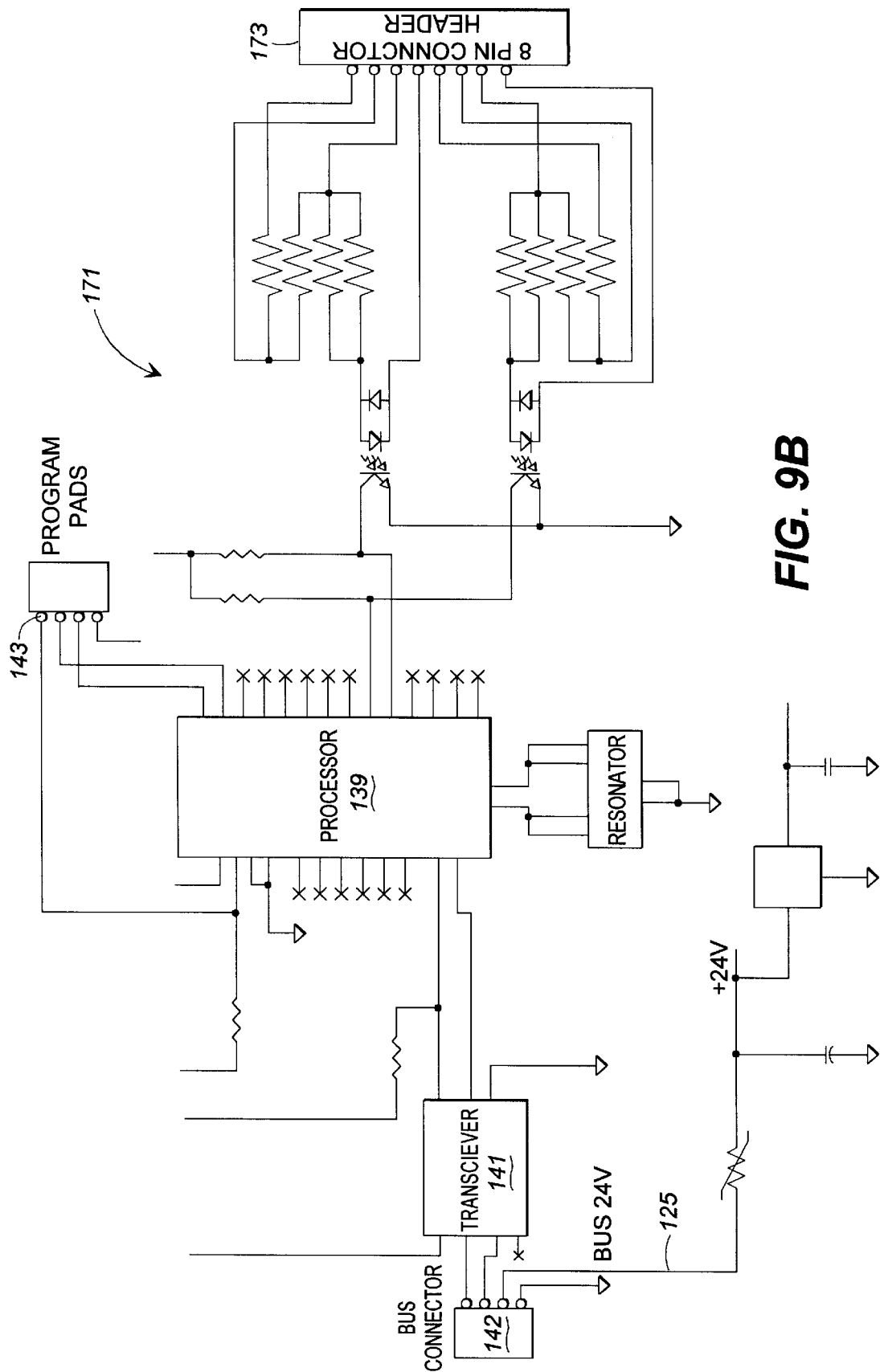

Each quad input module 170, as shown in FIG. 9A, also includes a second connector header 172 that typically is a twelve-pin connector header having a series of twelve connection pins and locking supports similar to the four-pin connector headers illustrated in FIG. 5. As illustrated in FIGS. 4A–4B, a series of control devices are connected to the quad input module. For example, as shown in FIG. 4A, the folder eye, raw edge detector and folded edge detector are all linked to the same quad input module, each having two lines connected to data transmission lines ports of the secondary connector and one line connected to a power output port of the second connector. As indicated in FIG. 9B, the opto-iso input modules 171 also have a second connector 173 that typically is an eight-pin connector header, having a series of eight connector pins and locking supports similar to the four-pin connector headers and as illustrated in FIG. 5. This eight-pin connector header 173 provides two optically isolated input channels for connection of the opto-iso input modules to devices such as the sewing machine to provide feedback information therefrom.

As shown in FIGS. 4B and 4C, the serial bus control system 15 further generally includes a series of quad output modules 180 and opto-iso output modules 181, each of which includes a four-pin bus connector header 142 (FIGS. 10A and 10B) that attaches the modules to the serial bus cable in a snap or press type fitting to provide a quick release connection for each of the quad output modules and opto-iso output modules to the serial bus cable. As FIGS. 10A and 10B illustrate, each quad output and opto-iso output module includes a processor chip 139 that generally is preprogrammed with general instructions for performing a desired set of functions, such as controlling the motors for the upper and lower edge guides and for the upstream and downstream roller assemblies as illustrated in FIG. 4C.

Figure 10A:
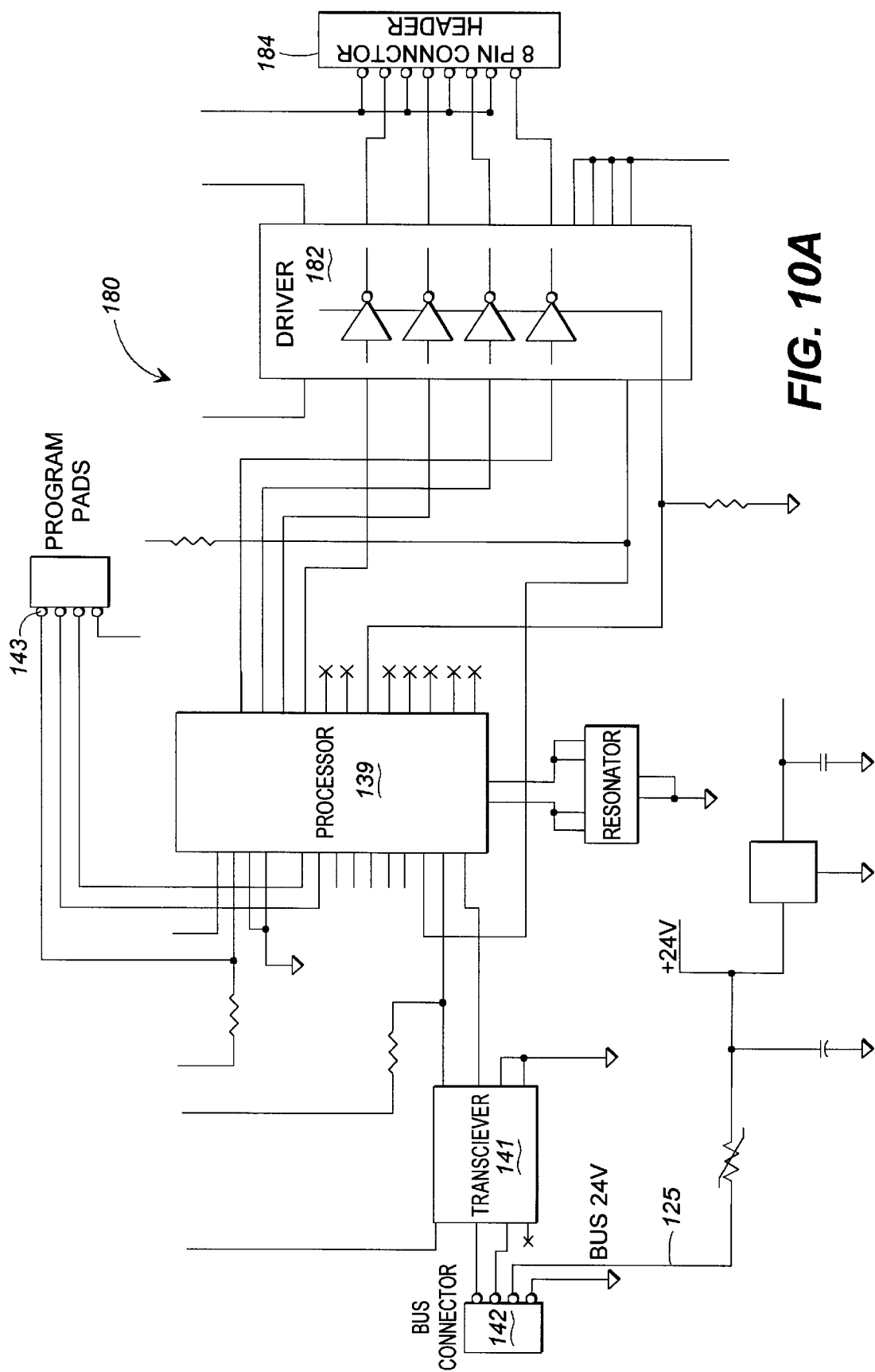
FIGS. 10A–10B are schematic diagrams of output modules for the serial bus control system of the present invention.
Figure 10B:
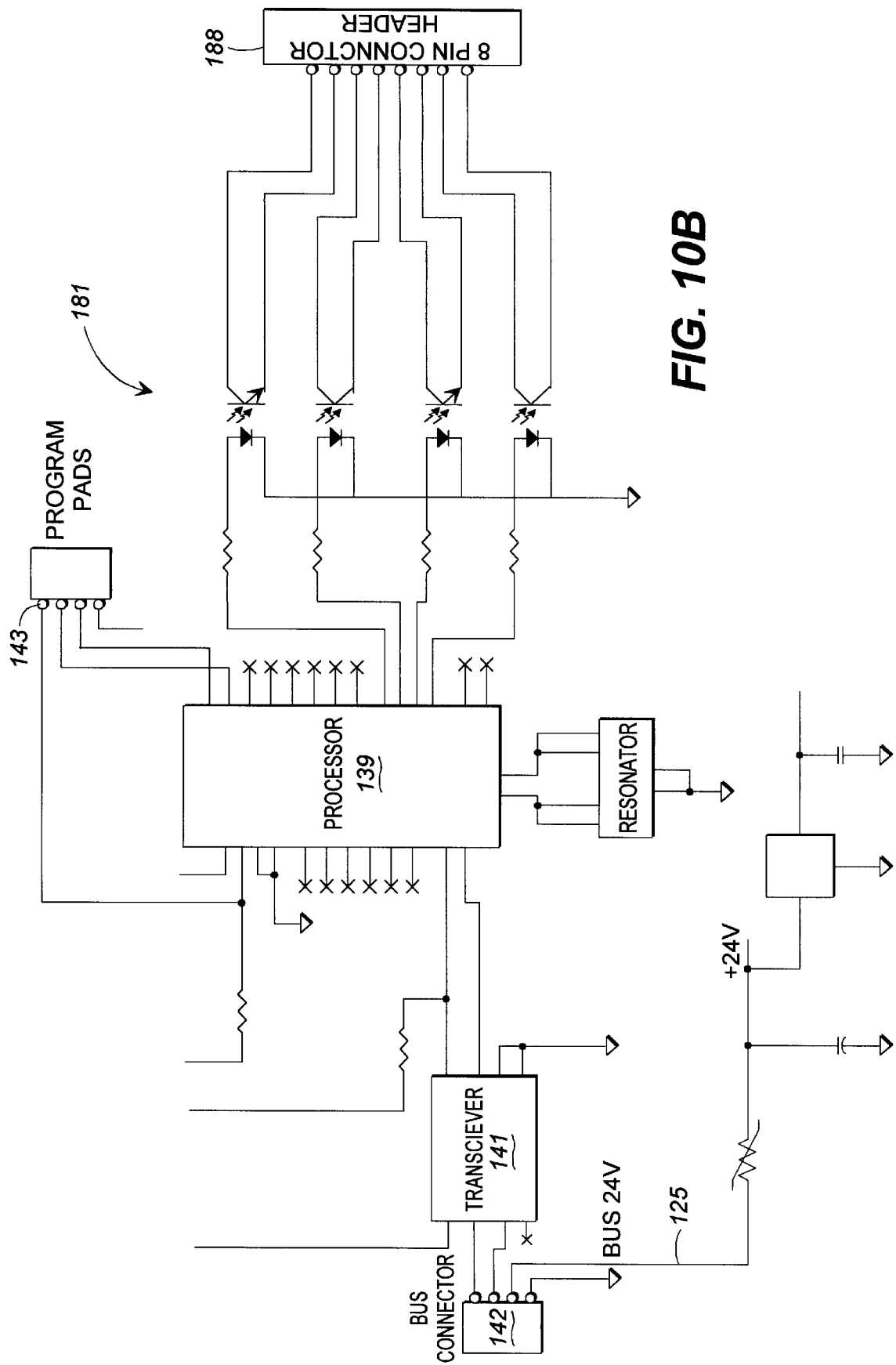

Each quad output module, as shown in FIG. 10A, also includes a driver chip 182 for driving output instructions from the modules to the external devices such as solenoids 183 (FIG. 4C) for actuating an air valve for the upper edge guide and for controlling the operation of the folder tongue and stacker bar. A second connector header 184 (FIG. 10A), that generally is an eight-pin connector header which provides four independent current-sinking output channels for controlling a series of up to four different control devices, is mounted to the circuit board opposite the four-pin bus connector header 139. For example, as illustrated in FIG. 4C, a single output module is used for controlling the thread wipe 186, uncurler airjets 187, folder airjets 88 and folder tongue 43 in response to command signals received from the system controller via the serial bus cable. Similarly, as shown in FIG. 10B, each opto-iso output module 181 includes a second connector header 188 that typically is an eight-pin connector similar to the second connector header 184 (FIG. 10A) of each output module 180, but which optically isolates the output channels from each other and from the serial bus as illustrated in FIG. 10B. Typically the opto-iso output modules are used for control of devices such as the sewing machine of the sewing station.

Each of the input, output, memory, and program modules is preprogrammed with a unique identifier that typically is in the form of a serial number, but which can be any other type of identifying signal or code. This identifier identifies modules on the serial bus control. Upon the initial power up of the system, each module sends its identifier via the serial bus cable to the system controller and to the memory module wherein these identifiers are recorded. As a result of these identifiers and the quick release connections of each of the modules, the modules accordingly can be disconnected and replaced as needed for repair or upgrade of the serial bus control system simply by replacing the desired module with another module having the same identifier. Upon repowering of the system, the system controller will first check for the presence of all previously recorded identifiers and, if it finds an identifier, and thus a module, missing, the system controller then looks for new modules with new identifiers. The new serial number is recorded and the software subroutines previously assigned to control the replaced module are assigned to the new module. Thereafter, the system will proceed with operation without requiring rewiring or reprogramming of the system, and without requiring the assistance of specially trained or skilled technicians to repair or perform upgrades to the sewing station.

In addition, each of the processor chips used for each module generally has in-circuit programming capabilities to enable one time programming of the processor chips through the pads or traces as well as data storage and retrieval so that data may be stored and retrieved from the memory module and program module by the system controller. To move data from the system controller computer to the memory module, the computer sends the memory module's address, a write command code, the memory destination address and then the data to which the memory module responds with an acknowledge code. To later retrieve this information, the computer again sends the memory module's address and sends a read command code to which the module responds by providing the requested data.

During operation of the serial bus control system for controlling the automated sewing equipment, here illustrated solely for purposes of example as a bottom hemming system or station, the serial bus control system is initially powered up with no modules installed except for the program and memory modules. The system controller then requests the assembler to begin plugging in each new input and output module one at a time. As each module is added, the computer scans the serial bus cable with all previously recorded or stored identifiers, i.e., serial numbers, until a module responds that has not responded before. The serial number of the newly added module is then recorded as is its position along the serial bus cable so as to set an address for each module according to its serial number and each subroutine for controlling each particular module is assigned in the system controller. The serial number and software assignment for each module are stored in the memory module. The system controller thereafter communications with and sends control signals or commands to the modules for controlling the various operational elements of the sewing station based upon the module's serial number. Once the modules are all installed, the system is ready for operation to control the sewing station.

During the sewing operation for the sewing station 10 (FIG. 1), presently illustrated as a circular bottom hemming station, as the garment body is placed over the drive rollers and cover the folded edge detector 96, the folded edge detector sends a signal via its input module and the serial bus cable to the system controller. In response to this input signal, the system controller sends a signal to the output module controlling the downstream roller assembly to cause the downstream roller assembly to be moved longitudinally outwardly along the sewing path. The downstream roller assembly is moved outwardly until the front roller portion 63 and pivot arm 64 are urged or moved in the opposite direction of movement of the downstream roller assembly in response to tensioning of the garment, causing a tension switch to be actuated. The actuation of the tension switch is recorded by its input module which communicates this information to the system controller upon being polled by the system controller. In response, the system controller sends a command signal to the output module controlling the downstream roller assembly to cause the movement of the downstream roller assembly to be halted.

With the garment body thus placed under tension, a jog or prefeed cycle is initiated for a preset time during which a folder eye (not shown) positioned beneath the folder plate and folder tongue checks for the presence and absence of the garment body so as to indicate that the folder is properly loaded and the edge guides are functioning properly. At the same time, the air jets, including airjets 88 (FIG. 3), are engaged to blow across the sewing path to try to remove any curl from the raw edge of the garment body prior to sewing. During the jog cycle, the system controller of the serial bus system polls or monitors the input modules for information as to a change of state in the folded edge detector, such as going from a light to a dark to light condition twice, to ensure that the folder is properly loaded and the edge guides are functioning properly.

Upon completion of the jog or prefeed cycle, the system controller sends a series of commands to various ones of the output modules for controlling the operation of the upstream and downstream rollers, the sewing machine and for controlling the edge guides to commence the automatic sewing cycle for the automatic sewing station 10 (FIG. 1). During the operation of the automatic sewing cycle of the sewing station, the system controller periodically polls the input modules for input information being provided to the input modules from the various detectors or sensors, such as the upper edge guide eye, or the raw edge and folded edge detectors. The frequency with which the inputs being provided to the input modules are polled by the system controller depends on various factors including the processing speed of the computer of the system controller and the number of inputs being provided to the serial bus control system. The fewer the inputs, the more frequently the system controller will check the input modules. Typically, the system controller will poll or query the input modules approximately every millisecond to every few seconds, although it will be understood that it will also be possible to perform this polling or querying function over shorter or longer time periods by varying the processing speed of the computer and the number of inputs being provided to the system controller. The system controller typically communicates with and provides operations commands to the output modules on an as-needed basis for actuation and control of a specific operative element, i.e., for driving the rollers of the upstream and downstream drive roller assemblies or for moving the downstream roller assembly longitudinally to tension the garment body, to reduce traffic on the serial bus cable.

During a first stage of the automatic sewing cycle, the folder eye controls the operation of the upper edge guide by moving the garment body laterally across the sewing path, while the bottom raw edge detector controls the lower edge guide in order to insure that the edges of the garment body and waistband remain in a desired alignment for sewing. As the sewn seam of the garment approaches the lower edge guide such that the raw edge detector no longer detects the presence of the garment body, a signal is sent to the system controller, which shifts the control of the lower edge guide to the folded edge guide or edge detector. The system controller also initiates operation of a timer for a folder tongue open delay, counting down a preset time until the folder tongue is retracted to open the folder. At the end of the folder tongue open delay, the system controller communicates with the output module that controls the operation of the folder tongue to cause the folder tongue to be retracted and at the same time cause the folder air jets to be shut off. The system controller continues monitoring the folded edge detector which monitors a the presence or absence of the folded and sewn seam.

Thereafter, when the hem detect eye is detected to be uncovered or reading a light condition by the system controller, the system controller begins the third stage of the automatic sewing cycle. During this final stage of the automatic sewing cycle, the upper edge guide is fully engaged to urge the edge of the garment body against the folder plate as sewing is continued for an oversew length adjustment time or cycle to complete the sewing cycle.

As the sewing cycle nears completion, the system controller directs the output module for the sewing machine to continue sewing until the end sew stitches are completed. The controller then stops the sewing machine with its needle in an up position and sends a command signal for the threads to be trimmed, so that the cloth can be removed from under the presser foot. Subsequently, the system controller sends a command signal to the output module for the stacker arm assembly 115 (FIG. 1) so as to cause the stacker arm assembly to be actuated. In response, the stacker bar 116 is moved from its position adjacent the front of the sewing station to an extended position spaced from the sewing station. At the same time, the downstream or left drive roller assembly is moved inwardly along the sewing path to remove tension from the garment body and enable the garment body to thus be removed from the drive rollers for stacking the finished garment on a stacker tray (not shown).

For repair or maintenance of the serial bus control system, the internal diagnostics of the control software are run to detect the existence of a fault or error condition. If a fault is detected in a particular module, the module is identified by its number indicating its position on the serial bus to advise the operator of the fault of problem condition with the sewing station. Thereafter, any modules in which a fault is detected are removed and replaced one at a time with the system being started between each module being replaced to ensure the system will record and allocate the portion of the software previously controlling the replaced module to the proper new module. Upon each start, the system controller scrolls through each module to check for the previously recorded serial numbers. If it finds a serial number is missing, the system controller then checks for new serial numbers, which indicate that a module has been replaced. The system controller records the new serial number for the new module and assigns to it the functions of the replaced module for continued system operation.

The serial bus control system of the present invention accordingly provides a simple and easy to install and maintain control system for controlling a variety of automated sewing equipment or sewing stations. By replacing point to point wiring with the serial bus cable and replaceable modules, the present invention can be easily maintained and upgraded or repaired by simply disconnecting the damaged module and replacing it with a new module that will then be assigned to perform the same function as the replaced module. In addition, the internal diagnostics of the control program for the serial bus control system of the present invention enables detection, diagnosis and troubleshooting of problems or fault conditions with the system, such as identifying a particular module in which a fault has occurred and which needs to be replaced. It is also possible to link the system controller of the present invention with a network server or modem to enable the serial bus control system operation to be monitored from remote locations such as through a plant computer network or over telephone lines via the modem to enable diagnosis and troubleshooting of problems or faults with the serial bus control system, which can then be remedied by sending a replacement module without requiring a technician to be sent to the plant.

It further will be understood by those skilled in the art that while the present invention has been disclosed with reference to an example embodiment, the serial bus control system of the present invention can be used for controlling various other types of automatic sewing stations or equipment and it will be further understood that various modifications, additions and changes can be made thereto without departing from the spirit and scope of the present invention as set forth in the following claims.

What is claimed is:

1. A control system for automated sewing equipment of type having a sewing machine positioned along a sewing path along which a work piece is manipulated and sewn, and having a sewing needle, at least one detector for monitoring the work piece, and a drive system for moving the work piece about the sewing path, said control system comprising:
   a system controller;
   a serial bus system in communication with said system controller; and including:
      a bus cable having a series of connectors therealong;
      a program module having programmed instructions for operation of the sewing system;
      at least one input module connected to said bus cable and to said at least one detector for communicating information from said detector to said system controller; and
      at least one output module connected to said bus cable and to said sewing machine and drive system for communicating control instructions from said control module to said sewing machine and said drive system;
         wherein each of said modules includes a connector adapted to releasibly engage a connector of said bus cable to enable ease of replacement of said modules.

2. The control system of claim 1 and further including a memory module connected to said serial bus cable for storing system data.

3. The control system of claim 1 and wherein said serial bus cable includes a power transmission line and a series of data transmission lines.

4. The control system of claim 1 and wherein each of said input and output modules is programmed with instructions for control of a desired function of the sewing equipment and each includes an identifier for enabling self addressing of said modules along said serial bus cable.

5. The control system of claim 1 and further including a power supply connected to said bus cable.

6. The control system of claim 1 and wherein each of said modules is programmed with instructions for control of a desired function of the sewing equipment and each includes an identifier for enabling self addressing of said modules along said serial bus cable.

7. The control system of claim 1 and wherein said bus cable includes a power transmission line and a series of data transmission lines.

8. The control system of claim 1 and further including a memory module connected to said bus cable for storing system data.

9. The control system of claim 1 and wherein the sewing equipment further includes edge guide assemblies for controlling an edge of the work piece with respect to the sewing path, each edge guide assembly being connected to an output module for control of said edge guide assemblies.

10. The control system of claim 1 and wherein the sewing equipment further includes a folder assembly having a folded edge detector connected to said input module for communicating position information regarding a folded edge of the work piece to said control module, and a movable folder tongue connected to and activated by one of said control modules for moving said folder tongue between a non engaging position and an engaging, folding position along the sewing path of the work piece.

11. A control system for a sewing station for sewing a work piece as the work piece is moved along a sewing path, the control system comprising:
   a system controller for interfacing with an operator;
   a serial bus cable having a series of connectors attached therealong;
   at least one input module connected to said bus cable for receiving and transmitting information about the operation of the sewing station to said system controller; and
   at least one output module connected to said bus cable and receiving instructions from said system controller for controlling the operation of selected elements of the sewing station;

wherein said input and output modules each include a connector for enabling quick connection and disconnection of said modules from said bus cable for ease of set up and replacement of said modules.

12. The control system of claim 11 and further comprising a program module mountable along said bus cable and programmed with control instructions and an identifier for addressing said program module along said bus cable.

13. The control system of claim 11 and further including a memory module connected to said bus cable for storing system data.

14. The control system of claim 11 and wherein said bus cable includes at least one power transmission line and at least two data transmission lines.

15. The control system of claim 11 and wherein each of said input and output modules is programmed with an identifier and control instructions for performing a desired function of the sewing station to enable identification and addressing of said modules along said bus cable.

16. The control system of claim 15 and further including a memory module connected to said bus cable for storing said module identifiers, system history and data and a system operation program.

17. The control system of claim 11 and further including at least one detector connected to an input module, and wherein a sewing machine for sewing the work piece and a drive system for moving the work piece about the sewing path are each connected to said at least one output module.

18. The control system of claim 11 further comprising an adapter module for connecting said system controller to said serial bus cable.

19. The control system of claim 11 and further comprising a network connection for connecting said system controller to a computer network for reporting and communication of information regarding system operation.

20. A method of controlling a sewing assembly of the type having a sewing machine with a sewing needle and a drive system for moving a work piece along a sewing path past the sewing needle for sewing the work piece, the method comprising:

initiating an operation program for controlling the operation of the sewing assembly through a system controller connected to a serial bus control system;

transmitting input information regarding the movement and sewing of the work piece to the system controller from at least one input module via the serial bus control system;

communicating program instructions for operation of the sewing machine and drive system along the serial bus control system to a series of output modules; and controlling the operation of the sewing machine and drive system with the output modules for sewing the work piece.

21. The method of claim 20 and further including initially powering the serial bus control system before beginning an initial sewing operation, connecting input and output modules to a serial bus cable of the serial bus control system, and, as each module is connected, recording a module identifier for each module for addressing the modules along the serial bus cable.

22. The method of claim 21 and further comprising the steps of removing a selected module upon detection of a fault condition in such module, and placing a replacement module having a different identifier from the removed module in the position of the removed module to enable quick and efficient maintenance of the serial bus control system.

23. The method of claim 21 and wherein the step of connecting input and output modules comprises fitting each module into a connector mounted along the serial bus cable.

24. The method of claim 20 and wherein the step of transmitting input information comprises receiving the input information from an input device at the input module and polling the input module periodically with the system controller to monitor the input information.

25. An automated sewing station for sewing a work piece moving along a sewing path through the sewing station, comprising, at least one sewing needle positioned along the sewing path of the work piece;

a drive system for moving the work piece along the sewing path;

a system controller for monitoring and controlling the sewing station; and a serial bus system in communication with said system controller and including:

a serial bus cable;

at least one input module mountable along said serial bus cable for transmitting information about the sewing of the work piece by the sewing station to said system controller via said serial bus cable; and at least one output module mountable along said serial bus cable and receiving instructions via said serial bus cable for controlling operation of selected operative elements of the sewing station for sewing the work piece as it is moved through the sewing station.

26. The automated sewing station of claim 25 and wherein each of said input and output modules further comprises a connector adapted to releasably engage a connector positioned along said serial bus cable to enable quick connection and disconnection of said modules for easy replacement of said modules.

27. A method of controlling a sewing assembly of the type having a sewing machine with a sewing needle and a drive system for moving a work piece along a sewing path past the sewing needle for sewing the work piece, the method comprising:

activating an operations program for controlling the operation of the sewing assembly for sewing the work piece through a system controller communicating program instructions for operation of the sewing machine and drive system from the system controller along a serial bus cable to a series of output modules;

monitoring and transmitting input information regarding the movement and sewing of the work piece from at least one input module to the system controller along the serial bus cable; and in response to the input information, controlling the operation of the sewing machine and drive system with the output modules for sewing the work piece.

28. The method of claim 27 and further including initially powering the serial bus cable before beginning an initial sewing operation, connecting input and output modules to the serial bus cable, and, as each module is connected, recording a module identifier for each module for addressing the modules along the serial bus cable.

29. The method of claim 28 and further comprising the steps of removing a selected module upon detection of a fault condition in such module, and placing a replacement module having a different identifier from the removed module in the position of the removed module to enable quick and efficient maintenance thereof.

30. The method of claim 28 and wherein the step of connecting input and output modules comprises fitting each module into a connector mounted along the serial bus cable.

31. The method of claim 27 and wherein the step of transmitting input information comprises receiving the input information from an input device at the input module and polling the input module periodically with the system controller to monitor the input information.

* * * * *